(12) United States Patent
Sannier et al.

(10) Patent No.: US 9,816,879 B2
(45) Date of Patent: Nov. 14, 2017

(54) TEMPERATURE SENSOR

(71) Applicant: SC2N, Creteil (FR)

(72) Inventors: Jean Sannier, Juaye Mondaye (FR); Stéphane Massiera, Andresy (FR); Marc Seigneur, Villons les Buissons (FR)

(73) Assignee: SC2N, Creteil (FR)

( * ) Notice: Subject to any disclaimer, the term of this patent is extended or adjusted under 35 U.S.C. 154(b) by 441 days.

(21) Appl. No.: 14/382,767

(22) PCT Filed: Mar. 14, 2013

(86) PCT No.: PCT/FR2013/050528
§ 371 (c)(1),
(2) Date: Sep. 4, 2014

(87) PCT Pub. No.: WO2013/140066
PCT Pub. Date: Sep. 26, 2013

(65) Prior Publication Data
US 2015/0023391 A1  Jan. 22, 2015

(30) Foreign Application Priority Data

Mar. 19, 2012 (FR) .................................. 12 52453

(51) Int. Cl.
*G01K 7/00* (2006.01)
*G01K 13/02* (2006.01)
(Continued)

(52) U.S. Cl.
CPC .............. *G01K 13/02* (2013.01); *G01K 1/08* (2013.01); *G01K 7/22* (2013.01);
(Continued)

(58) Field of Classification Search
None
See application file for complete search history.

(56) References Cited

U.S. PATENT DOCUMENTS

| 6,254,432 B1 | 7/2001 | Yoshigi | |
| 2012/0020385 A1* | 1/2012 | Matsuo | G01K 1/08 374/158 |
| 2012/0230365 A1* | 9/2012 | Clothier | G01K 7/36 374/163 |

FOREIGN PATENT DOCUMENTS

| DE | 91 08 581 U1 | 11/1991 |
| DE | 10 2004 018 354 A1 | 11/2005 |

(Continued)

OTHER PUBLICATIONS

International Search Report for corresponding International Application No. PCT/FR2013/050528, dated Jun. 14, 2013 (3 pages).

*Primary Examiner* — Erica Lin
(74) *Attorney, Agent, or Firm* — Osha Liang LLP

(57) ABSTRACT

The invention relates to a temperature sensor (1) for a motor vehicle comprising:—a housing (3) defining an internal volume comprising a temperature sensitive element (5),—electrical wires (9) linked electrically to said temperature sensitive element (5) and configured to transmit an item of temperature information from said sensitive element (5) to the exterior of the housing (3),—a seal (13) partially surrounding the said electrical wires (9) so as to isolate the sensitive element (5) with respect to the exterior of the housing (3), the seal (13) extending preferably in a direction, termed the longitudinal direction. According to the invention, said sensor (1) furthermore comprises a guidance means (15) integral with said seal (13) for the guiding of said electrical wires (9) out of said sensor, said guidance means (15) lying in the extension of said seal (13) according to the longitudinal direction of said seal (13) from a central zone of the seal (13) towards the exterior of said sensor housing (3), and the cross section of said guidance means (15) being of smaller dimension than that of the cross section of the seal (Continued)

Figure 1:
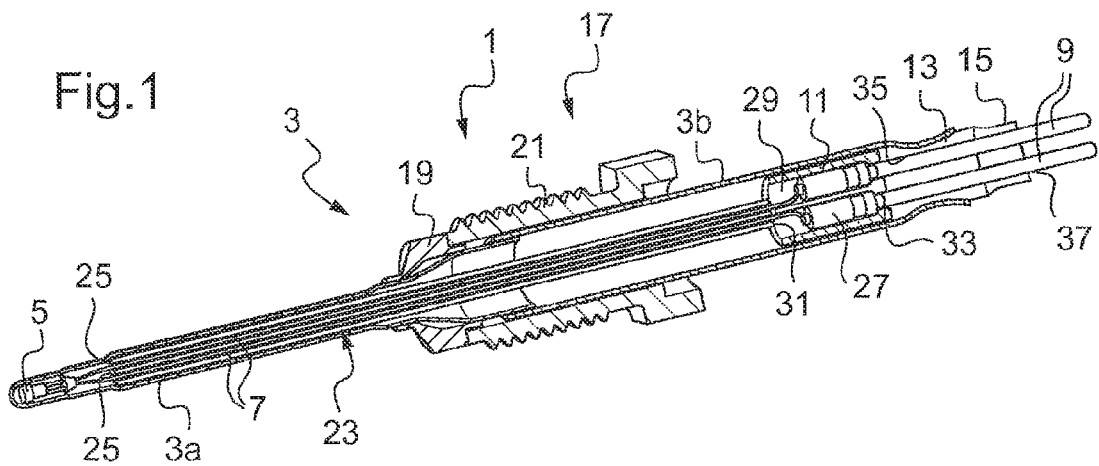

(13), at least one portion of said guidance means (15) lying outside the housing.

8 Claims, 1 Drawing Sheet

(51) Int. Cl.
*G01K 1/08* (2006.01)
*G01K 7/22* (2006.01)
*G01K 7/16* (2006.01)

(52) U.S. Cl.
CPC . *G01K 2007/163* (2013.01); *G01K 2013/024* (2013.01); *G01K 2205/04* (2013.01)

(56) References Cited

FOREIGN PATENT DOCUMENTS

| | | |
|---|---|---|
| DE | 10 2004 063 083 A1 | 7/2006 |
| FR | 2 849 199 A1 | 6/2004 |
| FR | 2 893 126 A1 | 5/2007 |

\* cited by examiner

TEMPERATURE SENSOR

The present invention relates to a temperature sensor, in particular for measuring high temperatures, for example higher than 900° C. or even higher than 1000° C.

The invention applies in particular to temperature sensors suitable for measuring the temperature of motor vehicle gases, such as the exhaust gases or the gases in the engine compartment.

Such sensors generally comprise a temperature-sensitive element, such as a thermistor, externally connected via electrical wires to an electrical/electronic circuit for processing a measurement signal.

By way of example, such a sensor comprises at one end a thermistor contained in a protective housing. Two first electrical wires in contact with this thermistor extend along the protective housing in order to be accessible outside the latter and to provide electrical information representative of the resistance of the thermistor, and consequently the temperature being measured. To this end, the first electrical wires are connected, for example via an electrical connection piece in the form of a socket, to second electrical wires used to provide the electrical connection to the electrical/electronic circuit. In general, the connection between the first and second electrical wires is carried out in an electrically insulating device.

With such a sensor being used particularly in the exhaust line or in the engine compartment, it is exposed to a very hostile situation because of the corrosive environment and sprays of oil or water. It is therefore important to ensure good leaktightness from the outside, particularly at the second electrical wires.

According to one known solution, this leaktightness is ensured by means of a seal in the sensor region opposite the temperature-sensitive element, having two parallel passage channels for the second electrical wires. The protective housing is crimped onto the seal in order to isolate the inside of the sensor from the external environment.

Furthermore, where they emerge from the sensor, that is to say where they emerge from the seal, the second electrical wires used to provide the electrical connection to the electrical/electronic circuit, even if they are covered with a sheath, cannot be protected against severe folding leading to locally severe deformations and therefore damage, or even fracture, of the wires.

According to one known solution, the sheath may be introduced into the housing of the sensor.

Although this solution makes it possible to limit the risk of folding and ensure continuous covering of the second wires, this solution has the drawback of making the housing of the sensor longer.

This is because the introduction of the sheath into the housing of the sensor makes it necessary to have double crimping, on the one hand the crimping of the housing onto the seal, and on the other hand the crimping onto the sheath in order to hold the sheath. In this case, the length between the innermost face of the seal and the end of the housing may be doubled in comparison with a standard sensor.

For the same sensor length, this presents the drawback of bringing the electrical insulator and the connections between the first and second electrical wires closer to the hot region of the sensor, located around the sensitive element.

As these components are temperature-sensitive, it is generally preferred to lengthen the rear of the sensor in order not to increase the maximum temperature at these components. However, this rear lengthening of the housing of the sensor may pose problems in terms of size and cost of the sensor.

It is therefore an object of the invention to at least partially overcome these drawbacks of the prior art by providing a sensor which makes it possible to guide and protect the second wires where they emerge from the sensor.

To this end, the invention relates to a temperature sensor for a motor vehicle, comprising:
a housing defining an internal volume comprising a temperature-sensitive element,
electrical wires electrically connected to said temperature-sensitive element and configured in order to send temperature information of said sensitive element outside the housing,
a seal partially surrounding said electrical wires so as to isolate the sensitive element from the exterior of the housing,
characterized in that said sensor furthermore comprises a guide means secured to said seal for guiding said electrical wires where they emerge from said sensor.

Said sensor may furthermore comprise one or more of the following characteristics, taken separately or in combination:
said guide means is produced in one piece with said seal;
said seal has a substantially cylindrical overall shape, and said guide means is in continuation of said seal along the longitudinal direction of the seal in the direction of the exterior of said sensor housing;
said guide means has a substantially cylindrical overall shape with a diameter less than the diameter of said seal;
said guide means extends out of the housing of said sensor;
said guide means extends at least partially inside the housing of said sensor;
said guide means is configured in order to be covered with an insulating sheath;
said guide means is a body comprising passage channels for the electrical wires; and
said passage channels are recesses in the body of the guide means for passage of their respective electrical wire;
said guide means is made of elastomer;
said sensor housing is crimped onto said seal.

The invention furthermore relates to a temperature sensor for a motor vehicle, comprising:
a housing defining an internal volume comprising a temperature-sensitive element,
electrical wires electrically connected to said temperature-sensitive element and configured in order to send temperature information of said sensitive element outside the housing,
a seal partially surrounding said electrical wires so as to isolate the sensitive element from the exterior of the housing, the seal preferably extending along a direction referred to as the longitudinal direction,
said sensor furthermore comprising a guide means secured to said seal for guiding said electrical wires where they emerge from said sensor, said guide means extending in continuation of said seal along the longitudinal direction of said seal, from a central region of the seal in the direction of the exterior of said sensor housing, and the cross section of said guide means having a size smaller than that of the cross section of the seal, at least one portion of said guide means extending out of the housing.

This sensor may comprise one or more of the aforementioned characteristics, taken separately or in combination.

Figure 2:
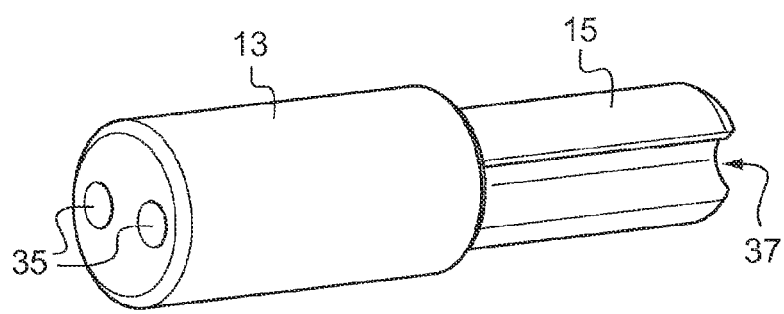
Figure 3:
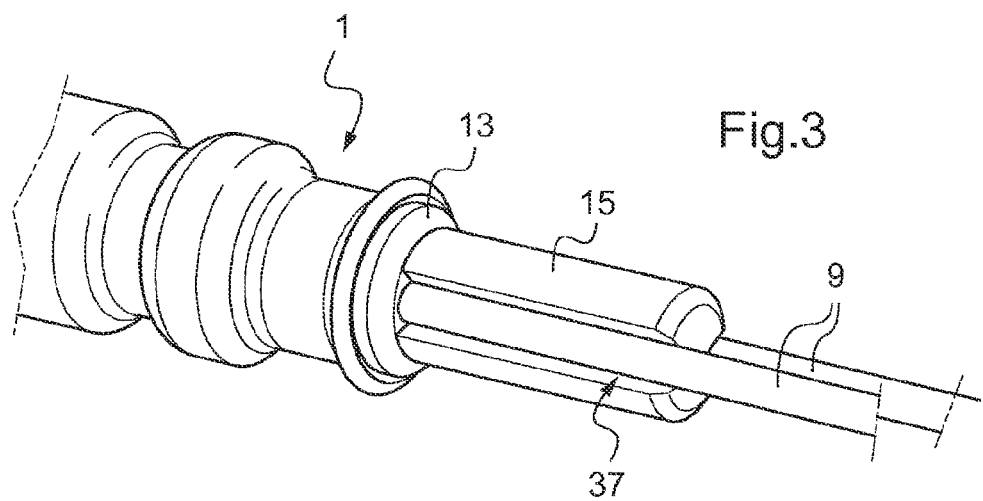

Other characteristics and advantages of the invention will emerge from the following description, given by way of example without limiting nature, with reference to the appended drawings, in which:

FIG. 1 represents a view in longitudinal section of a sensor according to the invention, FIG. 2 is a perspective view of a seal and its continuation, FIG. 3 is a perspective view of the seal and its continuation, partially surrounding electrical wires where they emerge from the sensor.

In these figures, elements which are substantially identical have the same reference numbers.

FIG. 1 represents a temperature sensor 1 comprising a protective housing 3 of tubular overall shape, containing, from a closed end:

a temperature-sensitive element, such as a thermocouple or a thermistor 5;

two first electrical wires 7 connected to two second electrical wires 9 used to provide the electrical connection to, for example, an electrical/electronic circuit of a processing unit in order to convey thereto the temperature signal provided by the thermistor 5;

an electrical insulator 11 at the electrical connection of the first 7 and second 9 electrical wires.

The protective housing 3 furthermore comprises a seal 13 partially surrounding the two second electrical wires 9 at the opposite end of the sensor 1 from the thermistor 5, and a means 15 for guiding the two second electrical wires 9 where they emerge from the sensor 1.

The protective housing 3 is, for example, crimped onto the seal 13, defining an internal volume comprising the temperature-sensitive element, the two first electrical wires 7, the electrical insulator 11 and at least one portion of the seal 13 and of the second electrical wires 9.

The protective housing 3 is made of a metallic material which withstands high temperatures, such as an alloy of chromium, nickel and iron of the Inconel® 601 type (registered trademark) or alternatively of refractory steel.

As can be seen in FIG. 1, the housing 3 may comprise a first part 3a at the thermistor 5 and a second part 3b, with a larger diameter than the first part 3a, at the connection region of the first 7 and second 9 electrical wires.

This housing 3 may comprise a system 17 for fastening on a wall (not shown) delimiting an environment of which the temperature is intended to be known, such as the cylinder head of an engine. To this end, the fastening system 17 may comprise an external stop 19 and a tightening means such as a screw 21 for tightening the stop 19 against a complementary bearing surface of the wall delimiting the environment to be measured.

The thermistor 5 is a passive component made of semiconductor material, the resistance of which varies as a function of the temperature. The thermistor 5 may be of the NTC type (negative temperature coefficient), the resistance of which decreases as a function of the rising temperature, or in the converse case of the PTC type (positive temperature coefficient), such as a platinum thermistor.

The first electrical wires 7 may be held in an insulating sheath 23 having an associated passage channel 25 for each first electrical wire 7, so that they are insulated from one another and held by the insulating sheath 23.

The insulating sheath 23 has, for example, an elongate overall shape, the longitudinal direction of which corresponds to the longitudinal direction of the first electrical wires 7.

This sheath 23 may comprise an external surface of cylindrical overall shape, so that it can match the wall of tubular shape, for example of the first part 3a, of the protective housing 3 and be held thereby.

By way of example, the sheath 23 is made of electrically insulating and heat-resistant ceramic on the inside, and made of refractory steel, for example, on the outside.

The first electrical wires 7 each have one end connected to the thermistor 5 and an opposite end connected to a second electrical wire 9. The first electrical wires 7 may be connected to the second electrical wires 9 by means of an electrical connection piece 27, for example in the form of a socket.

The second wires 9 may have a larger diameter and be made of less inert materials than the first wires 7, in order to reduce costs. The second electrical wires 9 are, for example, intended to be connected to a mating connector (not shown) remote from the sensor 1.

The electrical insulator 11 also has a cylindrical overall shape, so that it can match the wall of tubular shape, for example of the second part 3b, of the protective housing 3 and be held thereby.

By way of example, the electrical insulator 11 is made of electrically insulating and heat-resistant ceramic. For example, steatite is used. An electrical insulator 11 made of a plastic material resistant to high temperatures may also be provided.

In the example illustrated in FIG. 1, the electrical insulator 11 comprises two compartments 29 for receiving the connection sockets 27, as well as on the one hand two first passage channels 31 for the first electrical wires 7, and on the other hand two second passage channels 33 for the second electrical wires 9.

According to the example illustrated in FIG. 1, with second wires 9 having a diameter larger than the diameter of the first wires 7, the second passage channels 33 for the second electrical wires 9 correspondingly have a diameter larger than the diameter of the first passage channels 31 for the first wires 7.

The electrical insulator 11, arranged at the connection between the first 7 and the second 9 electrical wires, makes it possible to electrically insulate the two connection sockets 27 from one another, as well as from the housing 3.

Furthermore, the insulator 11 limits the translational movement of the connection sockets 27 in order to prevent tension on the second electrical wires 9 from leading to extraction or damage of the internal components of the sensor 1.

Furthermore, the electrical insulator 11 is arranged bearing against the seal 13.

For its part, the seal 13 is for example made of elastomer. By way of example, silicone or fluorocarbon may be selected as the material.

According to the embodiment illustrated in FIGS. 1 and 2, the seal 13 has a substantially cylindrical overall shape so that it can match the wall of tubular shape, for example of the second part 3b, of the protective housing 3 and be held thereby. The cylindrical seal 13 therefore has a sleeve shape.

As mentioned above, the seal 13 partially surrounds the second electrical wires 9 and, to this end, the seal 13 may have two passage channels 35 for the second electrical wires 9.

Furthermore, the housing 3 of the sensor 1 is, for example, crimped onto the seal 13 so as to isolate the sensitive element 5 from the exterior of the housing 3.

As regards the guide means 15, it is arranged at the end of the seal 13 opposite the end of the seal 13 bearing against the electrical insulator 11. The guide means 15 is therefore arranged on the side of the sensor 1 opposite the side containing the sensitive element 5.

In a similar way to the seal 13, the guide means 15 may have a substantially cylindrical overall shape with its longitudinal axis substantially parallel to the longitudinal axis of the sensor 1.

The guide means 15 is secured to the seal 13. The guide means 15 is thus secured to the housing 3 by means of the seal 13, without necessarily crimping of the housing onto the guide means 15.

The guide means 15 guides the second electrical wires 9 where they emerge from the sensor 1. It will be understood that such a guide means 15, arranged where the wires emerge from the housing 3 of the sensor 1, ensures holding of the second electrical wires 9 where they emerge from the sensor 1 and protects them against possible severe radii of curvature, which risk damaging the second wires 9 and accelerating their wear.

The guide means 15 is preferably made of a flexible material. Thus, the guide means 15 improves the protection against severe radii of curvature by avoiding the presence of a folding point which would damage the electrical wires 9. In a similar way to the seal 13, the guide means 15 may be made of elastomer.

More precisely, the guide means 15 is in continuation of the seal 13 along the longitudinal direction of the seal 13 and in the direction of the exterior of the housing 3 of the sensor 1.

To this end, the guide means 15 is for example made in one piece with the seal 13 (see FIGS. 2-3), for example by molding.

The continuation 15 could also be an additional part fixed, for example by adhesive bonding, to the seal 13 in order to fulfil the function of protecting the second electrical wires 9 where they emerge from the seal 13. Of course, this additional part could also be made of a material different to that of the seal 13.

Furthermore, the guide means 15 may be thinner than the seal 13, and therefore have a diameter less than the diameter of the seal 13. Moreover, the guide means 15 may have a length lying in a length range of the order of from 10 to 25 mm.

In order to guide the second electrical wires 9 where they emerge from the sensor 1, the guide means 15 at least partially surrounds the two second electrical wires 9 where they emerge from the seal 13.

To this end, the guide means 15 may comprise two passage means for the two second electrical wires 9. More particularly, the guide means 15 is a body comprising passage channels for the electrical wires 9. This guide means 15 therefore makes it possible to separate the two second electrical wires 9.

These passage means may for example, be produced in the form of closed passage channels, in a similar way to the channels 35 formed in the seal 13.

As a variant, the passage means may be open. For example, the passage means are produced by recessing in the body of the guide means 15, as illustrated in FIGS. 2 and 3. More precisely, the body, which is for example cylindrical, of the guide means 15 has two recesses 37 on either side for the passage of the two second electrical wires 9.

Furthermore, an insulating sheath (not shown) may be provided in order to cover the guide means 15 and the second electrical wires 9. This insulating sheath may for example have an elongate overall shape, the longitudinal direction of which corresponds to the longitudinal direction of the second electrical wires 9. The sheath improves the protection of the second electrical wires 9. The guide means 15 therefore makes it possible to guide the second electrical wires 9 and this insulating sheath (not shown) where they emerge from the sensor 1. The guide means 15 protects the wires 9 and the sheath from severe radii of curvature.

Furthermore, according to a variant illustrated in FIG. 1, the guide means 15 extends longitudinally out of the housing 3 of the sensor 1. In other words, it is not necessary to lengthen the rear part of the sensor 1, that is to say the part of the housing 3 of the sensor 1 opposite the thermistor 5, in order to protect the second electrical wires 9. This is because the guide means 15 holds the second wires 9 and therefore protects them against folding which could lead to their damage or fracture. For example, the guide means 15 extends out of the internal volume defined by the crimping of the protective housing 3 onto the seal 13.

When the guide means 15 extends out of the sensor, the sensor housing 3 may be standard, since it is not necessary to bring the connection sockets 27 and the insulator 11 close to the thermistor 5, or to lengthen the rear part of the housing 3 of the sensor 1.

According to another variant (not shown), the guide means 15 may be received at least partially or fully inside the housing 3 of the sensor 1. By making the guide means 15 covered with the sheath penetrate into the housing 3, the protection of the electrical wires against folding is improved. More precisely, according to this alternative, it is the guide means 15, with a diameter less than that of the seal 13 and covered with an insulating sheath (not shown), which may be received at least partially in the housing 3 of the sensor 1. Lastly, when the guide means 15, produced by continuation of the seal 13, is covered with a sheath and is received in the housing 3 of the sensor, it is not necessary to provide additional crimping since the housing 3 of the sensor 1 is already crimped onto the seal 13.

Of course, the invention is not limited to the examples described. For instance, the sensor may not comprise first electrical wires 7, the second wires 9 then being configured in order to be connected directly to the thermistor 5.

In the example of a sensor 1 described in FIGS. 1 to 3, the seal 13 and the guide means 15 have a substantially cylindrical overall shape. The seal 13 and the guide means 15 may, however, have different shapes. For example, they could be of substantially parallelepipedal shape. In particular, the seal 13 preferably extends along a direction referred to as the longitudinal direction. This direction may correspond to a direction of insertion of the seal 13 into the sensor 1. The transverse dimension of the seal 13 is configured in order to ensure leaktightness of the sensor 1 when the seal 13 is mounted in the housing 3.

The guide means 15 may then be in continuation of the seal 13 along the longitudinal direction of the seal. In particular, the guide means 15 is connected to the seal 13 in a central region of the seal 13. Thus, the guide means 15 forms a core around which the wires 9 come to bear in order to be guided where they emerge from the sensor 1. Preferably, the cross section of the guide means 15 has a dimension less than that of the cross section of the seal 13. Thus, the guide means 15 may be articulated more easily than the seal 13, which reduces the tearing stresses of the wires 9. This dimensional difference protects the seal/guide means assembly. Specifically, if the seal 13 and the guide means 15 had identical cross sections, this would generate greater stresses in the seal/guide means assembly during alternating movements of the electrical wires 9 around their central position (movements of the skipping rope type). Radial tearing could occur prematurely. The repetitive movement could also lead to cutting caused by the end of the housing 3.

The guide means 13 makes it possible to guide the wires 9 where they emerge from the sensor 1, that is to say out of the housing 3. To this end, the guide means 3 may comprise at least one portion extending out of the housing 3, so as to improve the guiding where they emerge from the sensor.

In particular, the sensor 1 may comprise a means for holding the electrical wires 9 on the guide means, such as adhesive, a collar or a sheath surrounding the electrical wires 9.

In one variant, the passage channels of the guide means are recesses 37 therein. Each recess 37 may form a channel, the wall of which matches at least a portion of the periphery of its respective wire 9 so as to contribute to the holding of the wire 9 inside it.

The invention claimed is:

1. A temperature sensor for a motor vehicle, comprising:
   a sensor housing having an internal volume comprising a temperature-sensitive element;
   electrical wires electrically connected to said temperature-sensitive element and configured to send temperature information of said temperature-sensitive element to an exterior of the sensor housing;
   a seal partially surrounding said electrical wires so as to isolate the temperature-sensitive element from the exterior of the sensor housing, the seal extending along a longitudinal direction; and
   a guide means secured to said seal for guiding said electrical wires where they emerge from said temperature-sensitive sensor, said guide means extending in continuation of said seal along the longitudinal direction of said seal, from a central region of the seal in a direction of the exterior of said sensor housing, and a cross section of said guide means having a size smaller than that of a cross section of the seal, at least one portion of said guide means extending out of the sensor housing,
   wherein said sensor housing is crimped onto the seal, and
   wherein said guide means extends out of the sensor housing.

2. The sensor as claimed in claim 1, wherein said guide means is part of the said seal.

3. The sensor as claimed in claim 1, wherein said seal and said guide means each have a substantially cylindrical overall shape.

4. The sensor as claimed in claim 1, wherein said guide means extends at least partially inside the sensor housing.

5. The sensor as claimed in claim 1, wherein said guide means is configured to be covered with an insulating sheath.

6. The sensor as claimed in claim 1, wherein said guide means comprises passage channels for the electrical wires.

7. The sensor as claimed in claim 6, wherein said passage channels are recesses in the guide means for passage of electrical wire.

8. The sensor as claimed in claim 1, wherein said guide means is made of elastomer.

* * * * *